(12) United States Patent
Haustein et al.

(10) Patent No.: US 8,473,701 B2
(45) Date of Patent: Jun. 25, 2013

(54) STORAGE MEDIA TO STORAGE DRIVE CENTRIC SECURITY

(75) Inventors: Nils Haustein, Soergenloch (DE); Craig A. Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1536 days.

(21) Appl. No.: 11/548,612

(22) Filed: Oct. 11, 2006

(65) Prior Publication Data
US 2008/0148068 A1  Jun. 19, 2008

(51) Int. Cl.
*H04L 9/00* (2006.01)
*G06F 12/14* (2006.01)

(52) U.S. Cl.
USPC .............. 711/164; 713/193; 380/277

(58) Field of Classification Search
USPC .............. 711/164; 713/193; 380/277
See application file for complete search history.

(56) References Cited

U.S. PATENT DOCUMENTS

| | | | |
|---|---|---|---|
| 5,651,064 A * | 7/1997 | Newell | 705/51 |
| 6,201,474 B1 | 3/2001 | Brady et al. | |
| 6,317,281 B1 * | 11/2001 | Ogawa et al. | 360/60 |
| 6,404,707 B1 * | 6/2002 | Kaneda et al. | 369/30.06 |
| 2002/0116283 A1 * | 8/2002 | Chatani | 705/26 |
| 2003/0046568 A1 | 3/2003 | Riddick et al. | |
| 2003/0074319 A1 * | 4/2003 | Jaquette | 705/51 |
| 2003/0095664 A1 | 5/2003 | Asano et al. | |
| 2004/0012876 A1 | 1/2004 | Tahara | |
| 2004/0042363 A1 * | 3/2004 | Kobayashi et al. | 369/53.21 |
| 2004/0054594 A1 | 3/2004 | Forster et al. | |
| 2005/0030662 A1 * | 2/2005 | Bui et al. | 360/48 |
| 2005/0248880 A1 | 11/2005 | Solhjell | |
| 2006/0013078 A1 | 1/2006 | Goodman et al. | |
| 2006/0041510 A1 | 2/2006 | Gagnon et al. | |
| 2006/0069752 A1 * | 3/2006 | Chatani | 709/219 |
| 2006/0221710 A1 * | 10/2006 | Sato | 365/189.01 |
| 2007/0180509 A1 * | 8/2007 | Swartz et al. | 726/9 |
| 2008/0049356 A1 * | 2/2008 | Weber et al. | 360/77.12 |

FOREIGN PATENT DOCUMENTS

JP  2004151243  6/2004

OTHER PUBLICATIONS

Abstract for EP1667143 (corresponding to CN1815611), published Aug. 9, 2006.

* cited by examiner

*Primary Examiner* — Mardochee Chery
(74) *Attorney, Agent, or Firm* — Hamilton & Terrile, LLP; Stephen A. Terrile

(57) ABSTRACT

A secure data system employs a storage media and a storage drive. A storage media identification key is embedded in a non-user modifiable area of the storage media and associated with data recorded on the storage media. The storage drive includes a memory having a storage drive identification key embedded therein. In operation, the storage drive allows access to the data recorded on the storage media based on a validation by the storage drive of the storage drive identification key as a function of the storage media identification key.

18 Claims, 9 Drawing Sheets

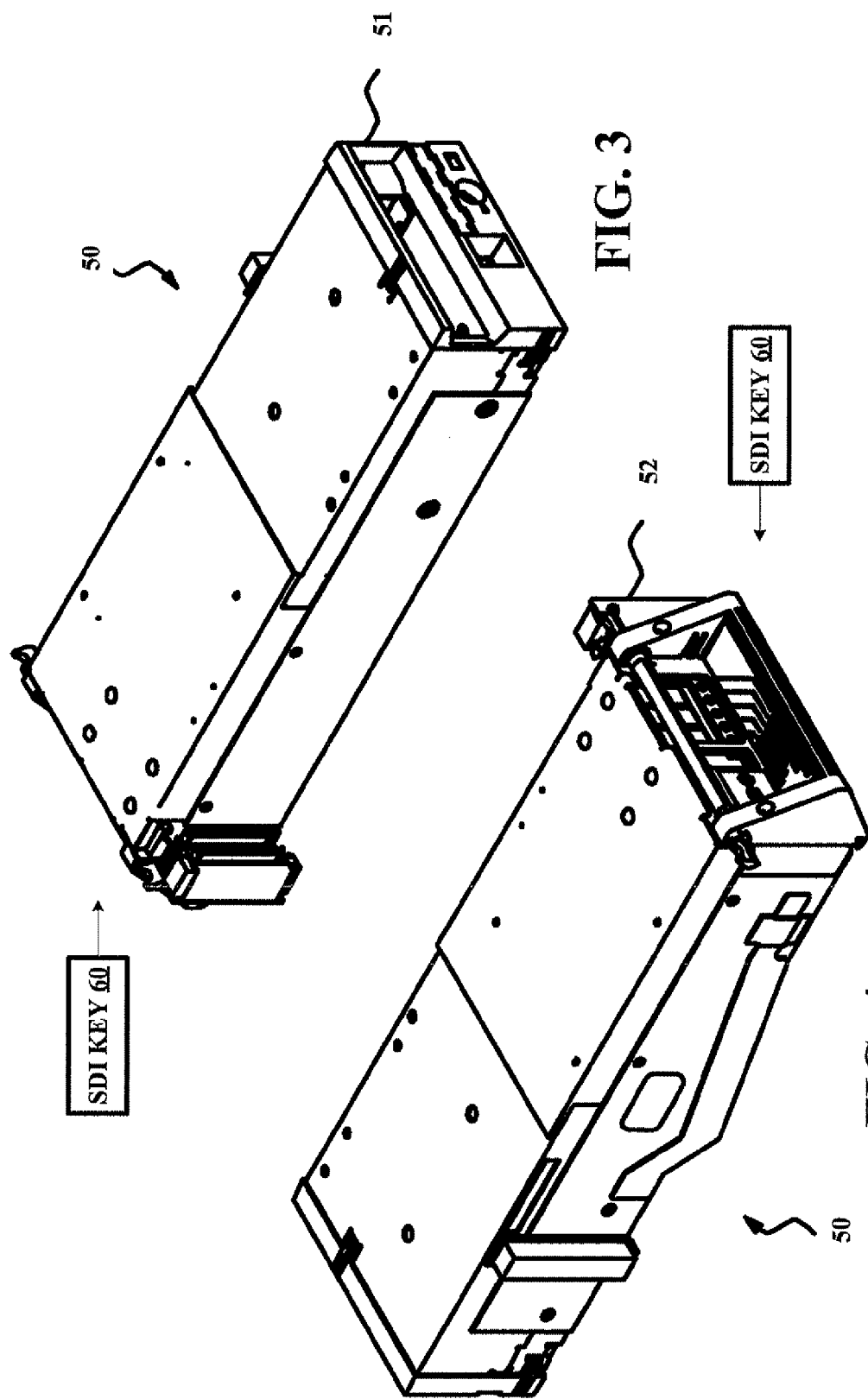

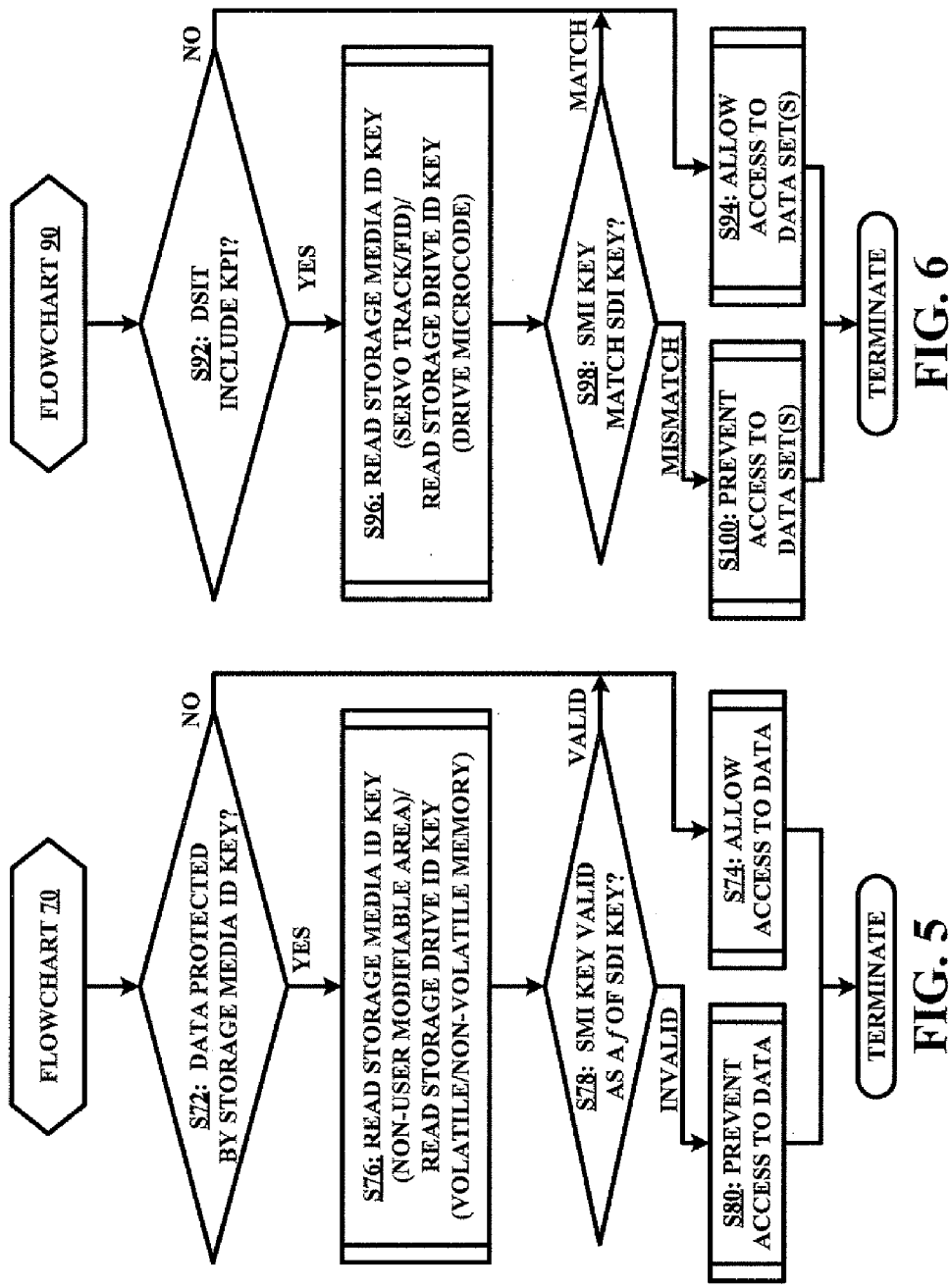

US 8,473,701 B2

STORAGE MEDIA TO STORAGE DRIVE CENTRIC SECURITY

FIELD OF THE INVENTION

The present invention generally relates to the security of data recorded on a storage media of any type (e.g., a magnetic tape, a magneto-optical tape, optical phase-change tape and an optical disk). The present invention specifically relates to establishing an operational relationship between the storage media and a storage drive for preventing unauthorized reading of the date data recorded on the storage media.

BACKGROUND OF THE INVENTION

FIGS. 1 and 2 respectively illustrate a tape media 20 and a tape cartridge 30. Tape media 20 is contained with a shell housing 31 of tape cartridge 30 that is adapted to interface with a tape drive 50 having a front end 51 shown in FIG. 3 and a rear end 52 shown in FIG. 4.

Specifically, tape cartridge 30 includes exterior cartridge shell 31 and sliding door 32. Sliding door 32 is slid open when tape cartridge 30 is inserted into tape drive 50. Sliding door 32 is normally closed when tape cartridge 30 is not in use, so that debris and contaminants do not enter tape cartridge 30 and degrade tape media 20. The direction that tape cartridge 30 is slid into the tape drive is shown as direction 35. Tape cartridge 30 also contains a cartridge memory 34, which is on a printed circuit board 33. Cartridge memory 34 is preferably at a 45° angle, to allow tape drive 50 and pickers of an automated storage library (not shown) to access the contents of cartridge memory 34.

Tape media 20 includes a tape reel 21, which is prevented from rotation by a brake button 22 when tape cartridge 30 is inserted in tape drive 50. Tape drive 50 releases brake button 22 when tape cartridge 30 is inserted into tape drive 50, which then allows the free rotation of tape reel 21. Tape reel 21 is wound with tape 25, which is preferably magnetic tape having edge guard bands, servo bands and data tracks as known in the art (e.g., a servo band 26 as shown). Alternatively, tape 25 could equally be in the art (e.g., a servo band 26 as shown). Alternatively, tape 25 could equally be magneto-optical or optical phase-change tape. On the free end of tape 25 is an optional leader tape 23 and leader pin 24. When tape cartridge 30 is slid into the tape drive, sliding door 32 is opened, and the tape drive threads leader pin 24 and attached leader tape 23 and tape 25 through the tape path. Tape 25 may be a data tape or a cleaner tape. Tape 25 may use the identical formulation of tape for both data and cleaning purposes. The contents of cartridge memory 34 are used to distinguish tape cartridge 30 as either a data cartridge or a cleaner cartridge. Optional leader tape 23 is preferably a thicker section of tape 25 which better withstand the load/unload operations of tape drive 50.

Currently, when data is stored on tape media 20, it is impossible to guarantee that tape cartridge 30 will not be stolen from a storage system (e.g., an automated data library) that contains tape cartridge 30 because it is easy for a person to pocket or otherwise conceal tape cartridge 30 and walk away with it. Essentially, preventing a removable media such as tape media 20 from being stolen contradicts the removable property of tape media 20. Therefore, it would be invaluable to a have a technique of preventing a removable media such as tape media 20 from being read after it has been stolen.

SUMMARY OF THE INVENTION

The present invention provides a new and unique storage media to storage drive centric security technique.

One form of the present invention is a secure data system comprising a storage media and a storage drive. A storage media identification key is embedded in a non-user modifiable area of the storage media, and the storage drive includes a memory having a storage drive identification key embedded therein. The storage drive is operable to allow access to data recorded on the storage media based on a validation by the storage drive of the storage drive identification key as a function of the storage media identification key.

A second form of the present invention is a secure data method for a storage media and a storage drive. The secure data method involves an embedding of a storage media identification key in a non-user modifiable area of the storage media, an embedding of a storage drive identification key in a memory of the storage drive, and a configuration of the storage drive to allow access to data recorded on the storage media based on a validation by the storage drive of the storage drive identification key as a function of the storage media identification key.

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIGS. 3 and 4 respectively illustrate a front view and a rear view of one embodiment of a tape drive in accordance with the present invention;

FIG. 5 illustrates a flowchart representative of a general embodiment of a secure data read method in accordance with the present invention;

FIG. 6 illustrates a flowchart representative of one embodiment of the secure data read method illustrated in FIG. 5 in accordance with the present invention;

DETAILED DESCRIPTION OF THE PRESENT INVENTION

The present invention is premised on embedding a storage media identification key in a non-user modifiable area of any type of storage media and embedding a storage drive identification key in a memory (volatile or non-volatile) of a suitable storage drive for reading data of the storage media whereby the storage drive must implement a security check technique involving the storage drive checking and verifying (i.e., validating) its embedded storage drive identification key as a function of the embedded storage media identification key prior to reading data recorded on the storage media to thereby guarantee that storage drive is authorized to read the data recorded on the storage media.

A flowchart 70 illustrated in FIG. 5 represents a secure data read method of the present invention for generally guaranteeing that data recorded on a storage media of any type can only be read by an authorized storage drive capable of reading the recorded data. While the secure data read method of the present invention as represented by flowchart 70 is applicable to any type of storage media, flowchart 70 is presented in the context of a storage media identification key ("SMI KEY") 40 (FIGS. 1 and 2) being embedded on tape 25 (FIG. 1) contained within tape cartridge 30 (FIG. 2) and in the context of a storage drive identification key ("SDI KEY") 60 (FIGS. 3 and 4) being embedded in a memory, volatile or non-volatile, of tape drive 50 (FIGS. 3 and 4) to thereby facilitate a general understanding of the inventive principles of the present invention.

Figure 1:
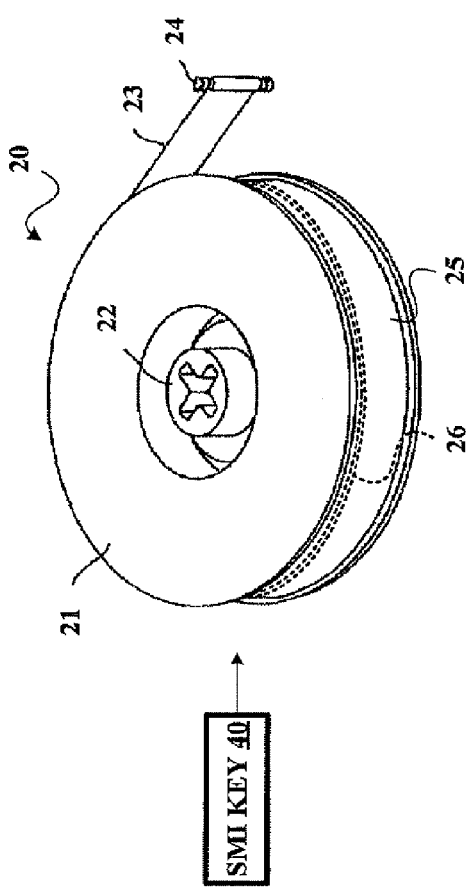
FIG. 1 illustrates one embodiment of a tape media in accordance with the present invention.
Figure 2:
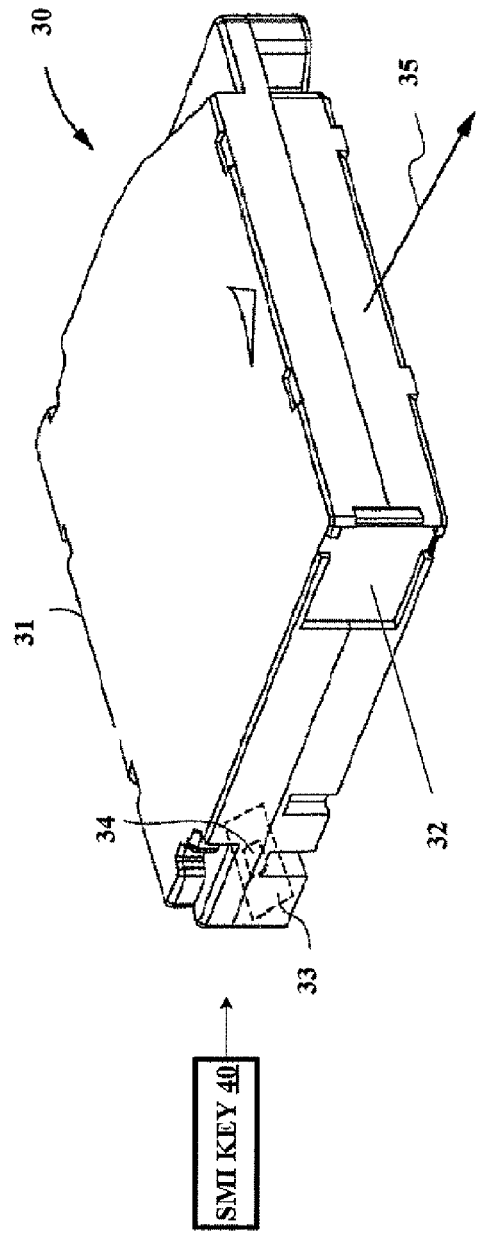
FIG. 2 illustrates one embodiment of a tape cartridge in accordance with the present invention.

Referring to FIG. 5, a stage S72 of flowchart 70 encompasses tape drive 50 determining whether the data recorded on tape 25 is protected by a storage media identification key 40 embedded in a non-user modifiable area of tape 25, such as, for example, servo band 26 shown in FIG. 1. The present invention does not impose any limitations or any restrictions as to the manner by which tape drive 50 determines if the data recorded on tape 25 is protected by storage media identification key 40. In one exemplary embodiment as will be further described herein, tape drive 50 searches an information table recorded on tape 25 for a key protection indicator.

If the data recorded on tape 25 is not protected by storage media identification key 40 (e.g., tape drive 50 is unable to locate a key protection indicator in an information table recorded on tape 25), then tape drive 50 proceeds to a stage S74 of flowchart 70 to allow access for a host/controller of tape drive 50 to the recorded data. Otherwise, if the data recorded on tape 25 is protected by storage media identification key 40 (e.g., tape drive 50 is able to locate a key protection indicator in an information table recorded on tape 25), then tape drive 50 proceeds to a stage S76 of flowchart 70 to read storage media identification key 40 as embedded in a non-user modifiable area of tape 25 and to read storage drive identification key 60 as embedded in a memory of tape drive 50. The present invention does not impose any limitations or any restrictions as to the form of keys 40 and 60.

Upon reading the keys 40 and 60, a stage S78 of flowchart 70 encompasses tape drive 50 determining whether storage drive identification key 60 is valid for tape drive 50 to read the recorded data as a function of tape media identification key 40. If storage drive identification key 60 is determined to be valid by tape drive 50, then tape drive 50 proceeds to stage S74 to allow access for a host of tape drive 50 to the recorded data. Otherwise, if keys storage drive identification key 60 is determined to be invalid by tape drive 50, then tape drive 50 proceeds to a stage S80 of flowchart 70 to prevent access to the day by a host/controller of tape drive 50.

The present invention does not impose any limitations or any restrictions as to the manner by which tape drive 50 determines whether storage drive identification key 60 is valid as a function of storage media identification key 40 for reading the recorded data. In one exemplary embodiment, storage drive identification key 60 is determined to be valid by tape drive 50 as a function of storage media identification key 40 for reading data the recorded data if keys 40 and 60 are identical or equivalent (e.g., key 40 is a specified portion of key 60 or vice-versa). In another exemplary embodiment storage drive identification key 60 is determined to be valid by tape drive 50 as a function of storage media identification key 40 for the recorded data if key 40 can be used to correctly decode or encode key 60, or vice-versa.

A flowchart 90 illustrated in FIG. 6 represents a secure data read method of the present invention for specifically guarantying that data recorded on a tape media can only be read by an authorized tape drive capable of reading the recorded data. While the secure data read method of the present invention as represented by flowchart 90 is applicable to any type of tape media, flowchart 90 is presented in the context of a tape 110 shown in FIG. 7 having two (2) edge guard bands 111, five (5) servo bands 112 and four (4) data tracks 113 with each data track 113 having a non-use modifiable area ("NUMA") 114. Edge guard bands 111 have neither data nor servo, but serve as a border between the outermost servo bands 112 and the longitudinal edges of tape 110.

Figure 7:
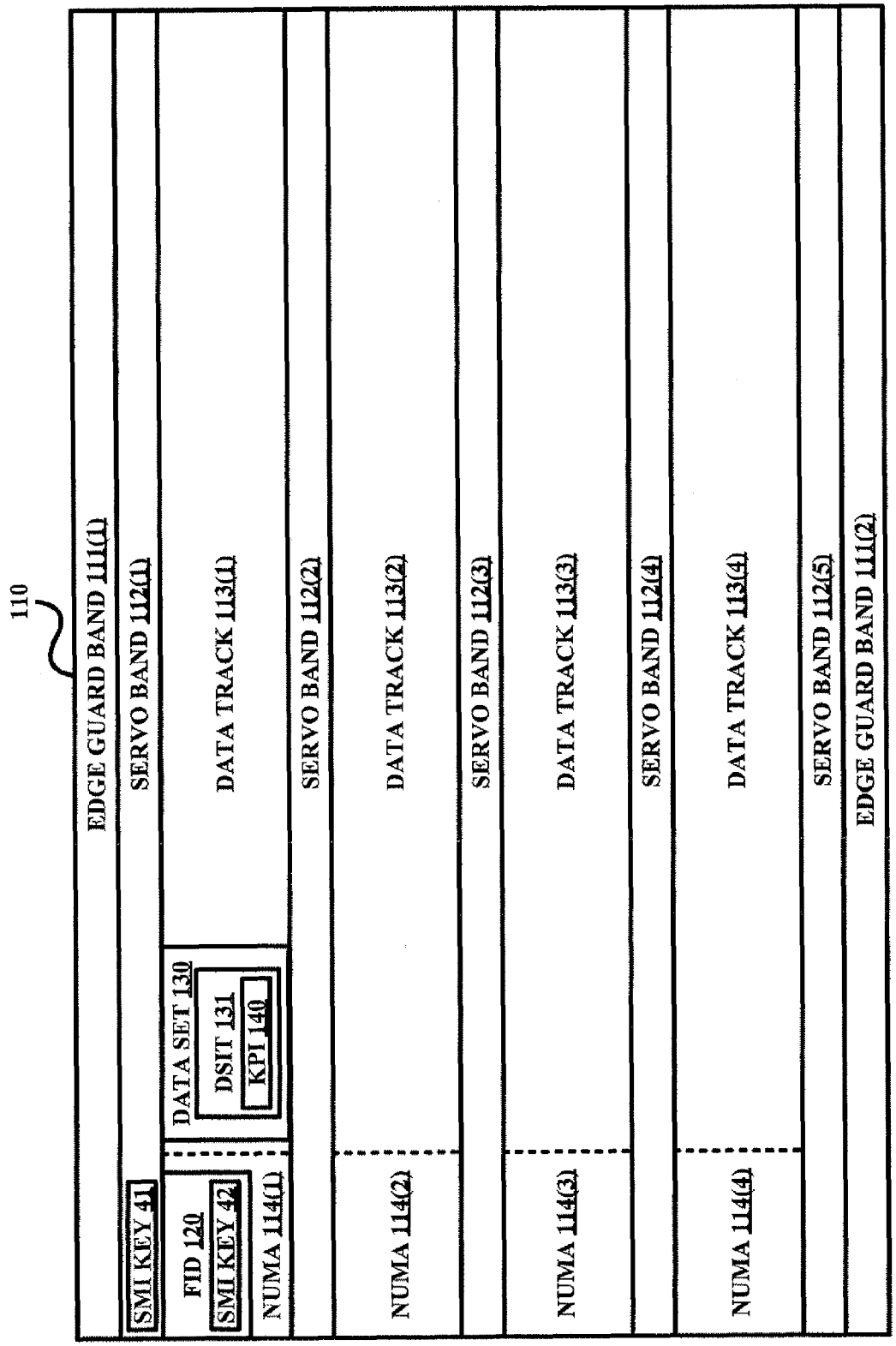
FIG. 7 illustrates an exemplary embodiment of a tape media configured in accordance with the present invention.

In one embodiment, a storage media identification key ("SMI KEY") 41 is recorded on a servo band 112(1) within a manufacturer data segment of a Linear Position ("LPOS") word (i.e., a non-user modifiable area of tape 110). In an alternate embodiment, a storage media identification key ("SMI KEY") 42 is listed in a Format Identification Data Region ("FID") recorded in non-user modifiable area 114(1) of data track 113(1) to the left of the dashed line within data track 113(1) as shown in FIG. 7. For example, storage media identification key 42 can be written in Reserved Field listed at a byte position 224 of the following FID table:

| FID TABLE | | |
|---|---|---|
| BYTE POSITION | BYTE LENGTH | CONTENTS (FIELDS) |
| 0 | 32 | LTO CM Manufacturer's Information |
| 32 | 64 | Cartridge Manufacturer's Information |
| 96 | 64 | Media Manufacturer's Information |
| 160 | 64 | Initialization Data |
| 224 | 104 | Reserved (KEY 42) |
| 328 | 128 | FID Housekeeping |
| 456 | 12 | FID Housekeeping C1 |

Flowchart 90 is further presented in the context of a key protection indicator ("KPI") 140 being exclusively listed in a Data Set Information Table ("DSIT") 131 of a data set 130 recorded within data track 112(1) as shown in FIG. 7, or alternatively listed in a Data Set Information Table of two or more data sets recorded with data tracks 112 as would be appreciated by those having ordinary skill in the art. For example, key protection indicator 140 can be written in a Data Set Type Field listed at a byte position 458 of the following DSIT table:

| DSIT TABLE | | |
|---|---|---|
| BYTE POSITION | BYTE LENGTH | CONTENTS (FIELDS) |
| 0 | 228 | Drive Manufacturer Use |
| 228 | 12 | Drive Manufacturer Use CI |
| 240 | 176 | Reserved |
| 416 | 8 | Drive Manufacturer's Identity |
| 424 | 4 | Data Set Number |
| 428 | 4 | Valid Data Length |
| 432 | 4 | Access Point Offset |
| 436 | 6 | Total Records |
| 442 | 6 | Total File Marks |
| 448 | 4 | Record Count |
| 452 | 4 | File Mark Count |
| 456 | 2 | Thread Count |
| 458 | 1 | Data Set Type (KPI 140) |
| 459 | 1 | Data Set Flags |
| 460 | 4 | Thread Write Pass |
| 464 | 4 | Tape Write Pass |

Referring to FIG. 6, a stage S92 of flowchart 90 encompasses tape drive 50 determining whether Data Set Information Table 131 includes key protection indicator 140 corresponding to one data set a subset of data sets or all data sets recorded on tape 110. The present invention does not impose any limitations or any restrictions as to the form of the key protection indicator as written in Data Set Information Table 131. In one exemplary embodiment, a currently unused dataset type of 0X03 (hexadecimal 3) is written in a Date Set Type Field of Data Set Information Table 131 as opposed to the known dataset type 0X00 (hexadecimal 0) which commonly denotes user data. A commonly used tape drive would recognize 0X00 but not 0X03; however, a tape drive practicing the subject invention would recognize the 0X03.

If tape drive 50 determines Data Set Information Table 131 excludes key protection indicator 140, then tape drive 50 proceeds to a stage S94 of flowchart 90 to allow access for a host/controller of tape drive 50 to the recorded data associated with Data Set Information Table 131. Otherwise, if tape drive 50 determines Data Set Information Table 131 includes key protection indicator 140, then tape drive 50 proceeds to a stage S96 of flowchart 90 to read storage media identification key 41 as recorded in servo band 112(1) or storage media identification key 42 as recorded in FID table 120 (whichever is applicable), and to read storage drive identification key 60 as embedded in microcode stored in non-volatile memory of tape drive 50. The present invention does not impose any limitations or any restrictions as to the form of keys 41, 42 and 60.

Upon reading the keys, a stage S98 of flowchart 90 encompasses tape drive 50 determining whether storage media identification key 41 matches storage drive identification key 60, or whether storage media identification key 42 matches storage drive identification key 60 (whichever is applicable). If the appropriate keys are determined by tape drive 50 to be a match, then tape drive 50 proceeds to stage S94 to allow access for a host/controller of tape drive 50 to the recorded data associated with key protection indicator 140. Otherwise, if the keys are determined by tape drive 50 to be a mismatch, then tape drive 50 proceeds to a stage S100 of flowchart 90 to prevent access by a host/controller of tape drive 50 to the recorded data associated with key protection indicator 140.

Referring to FIGS. 1-7, those having ordinary skill in the art will appreciate the numerous advantages of the present invention, including, but not limited to, providing an owner of a storage media with control over which storage drives can read the storage media to thereby prevent the storage media from being read by an unauthorized storage drive. This advantage can be practiced in unlimited modes, including, but not limited to, formatting storage media and setting the microcode of a storage drive with the appropriate keys and indicators at the time of manufacture as specified by the manufacturer or by the owner of the storage media and storage drive. Additionally, the keys and indicators may either be fixed, or resetable by the owner via a SCSI mode set command, a special microcode load, a user interface of the storage drive and/or a drive-library interface.

Referring to FIG. 7, as stated previously herein, the present invention does not impose any limitations or any restrictions as to the form of storage media identification key 41 as recorded in a LPOS word of a servo band. Nonetheless, the following description of various timing based servo band patterns may be employed for purposes of forming storage media identification key 41.

Figure 8:
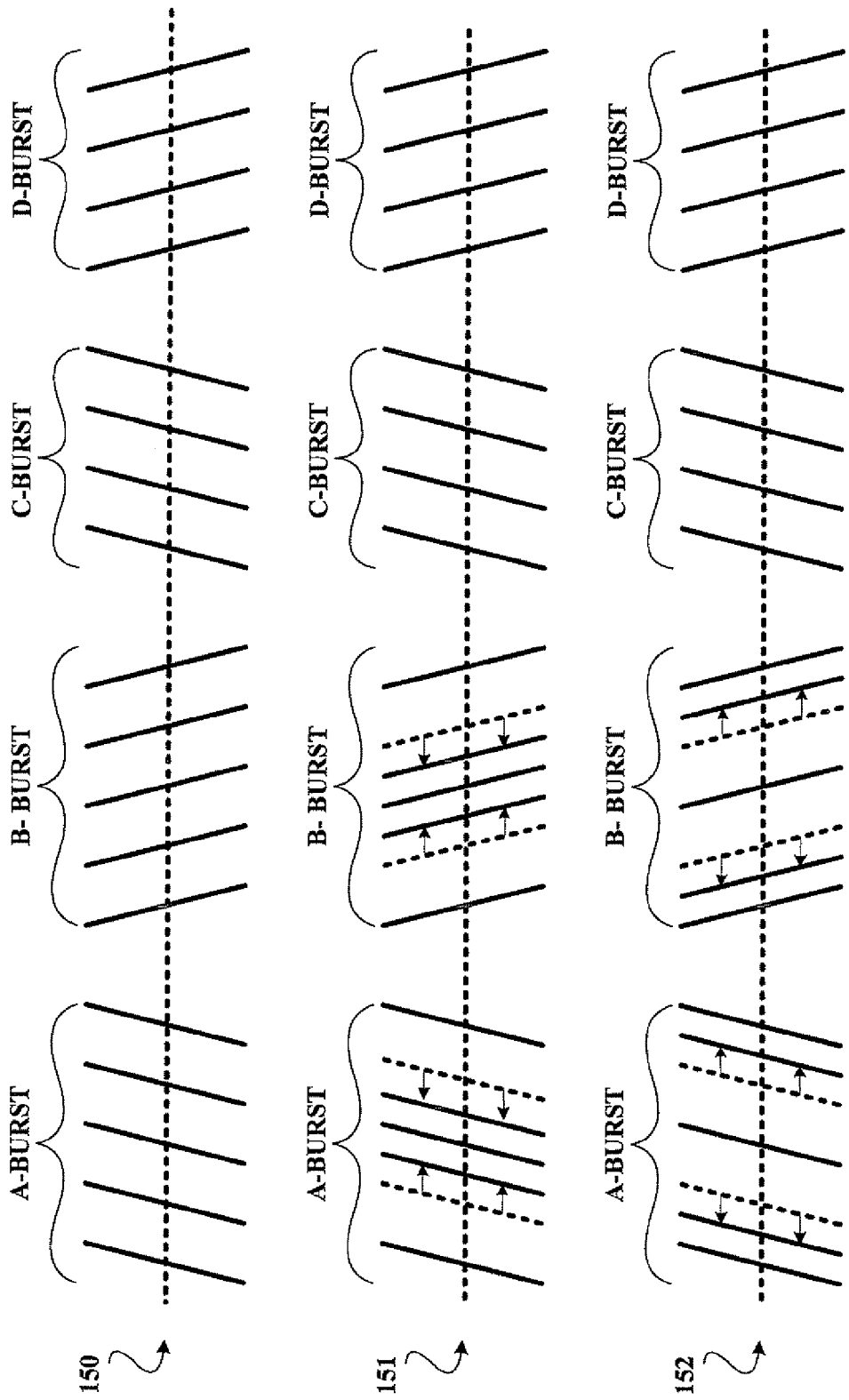
FIG. 8 illustrates an exemplary encoding of a timing based servo pattern as a first embodiment of a storage media identification key in accordance with the present invention.

FIG. 8 illustrates an exemplary timing based servo pattern 150 serving as a basis for a storage media identification key of the present invention. Timing based servo pattern 150 includes a standard A-burst of five (5) magnetic forward-slash stripes (/////), a standard B-burst of five (5) magnetic backward-slash stripes (\\\\\), a standard C-burst of four (4) magnetic forward-slash stripes (////) and a standard D-burst of four (4) magnetic backward-slash stripes (\\\\). To encode a binary digit 0, a pattern 151 as shown is derived from pattern 150 whereby a second magnetic forward-slash stripe and a fourth magnetic forward-slash stripe of the A-burst are shifted closer to a middle (third) magnetic forward-slash stripe of the A-burst, and a second magnetic backward-slash stripe and a fourth magnetic backward-slash stripe of the B-burst are shifted closer to a middle (third) magnetic forward-slash stripe of the B-burst. To encode a binary digit 1, a pattern 152 as shown is derived from pattern 150 whereby the second magnetic forward-slash stripe of the A-burst is shifted closer to a first magnetic forward-slash stripe of the A-burst and the fourth magnetic forward-slash stripe of the A-burst is shifted closer to a fifth magnetic forward-slash stripe of the A-burst, and the second magnetic backward-slash stripe of the B-burst is shifted closer to a first magnetic backward-slash stripe of the B-burst and the fourth magnetic backward-slash stripe of the B-burst is shifted closer to a fifth magnetic backward-slash stripe of the B-burst.

For purposes of the present invention, encoded "0" pattern 151 and encoded "1" pattern 152 can be used to record storage media identification key 41 within a LPOS word of a servo band 112 of a tape media 110 (FIG. 7).

Figure 9:
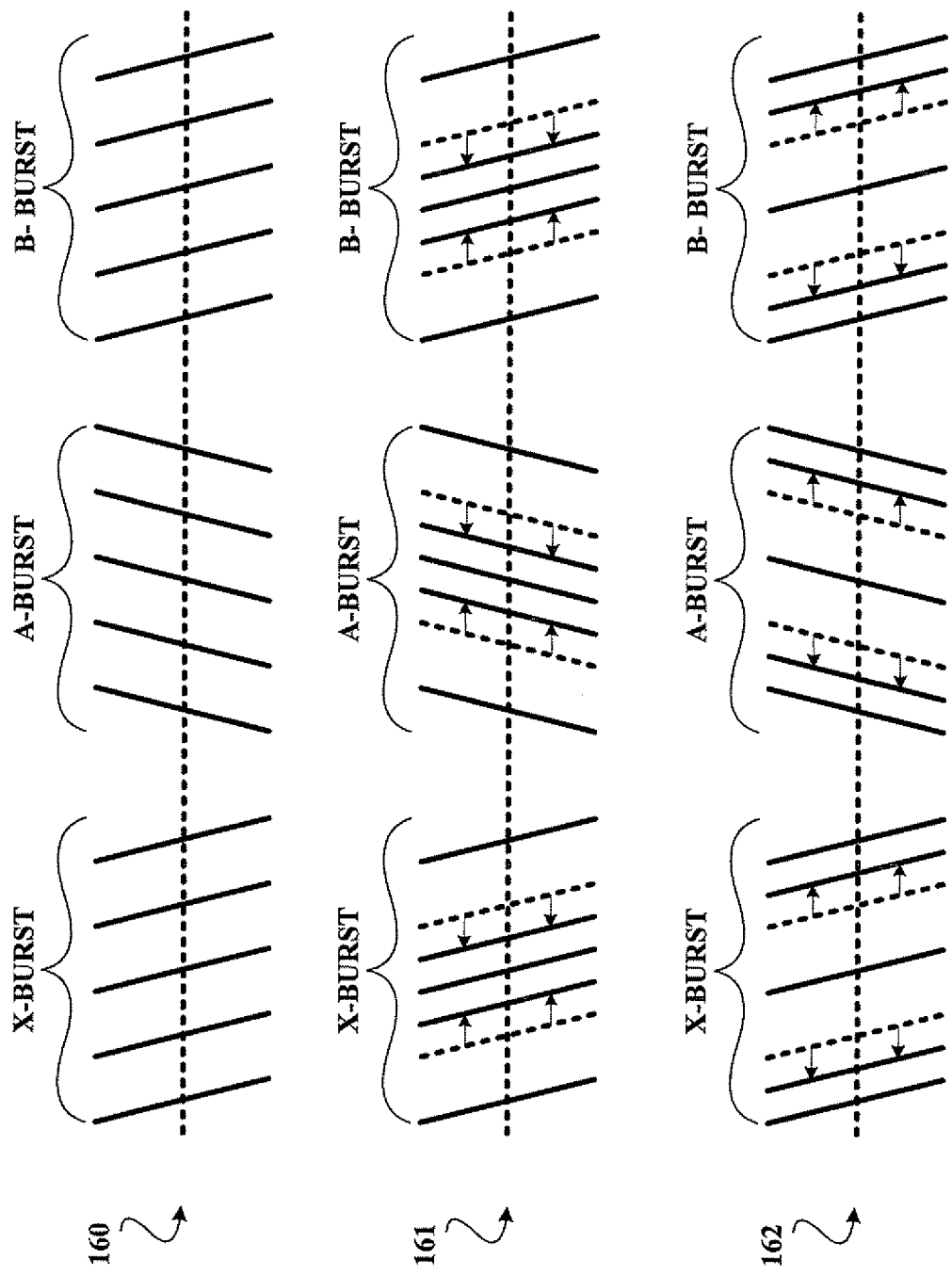
FIG. 9 illustrates an exemplary encoding of a differential timing based servo sub pattern as a second embodiment of a storage media identification key in accordance with the present invention.

FIG. 9 illustrates an exemplary differential timing based servo sub pattern 160 serving as a basis for a storage media identification key of the present invention. Differential timing based servo sub pattern 160 includes a standard X-burst of five (5) magnetic backward-slash stripes, standard A-burst of five (5) magnetic forward-slash stripes (/////) and a standard B-burst of five (5) magnetic backward-slash stripes (\\\\\) as shown. To encode a binary digit 0, a pattern 161 as shown is derived from pattern 160, whereby (1) a second magnetic backward-slash stripe and a fourth magnetic backward-slash stripe of the X-burst are shifted closer to a middle (third) magnetic forward-slash stripe of the X-burst, (2) a second magnetic forward-slash stripe and a fourth magnetic forward-slash stripe of the A-burst are shifted closer to a middle (third) magnetic forward-slash stripe of the A-burst, and (3) a second magnetic backward-slash stripe and a fourth magnetic backward-slash stripe of the B-burst are shifted closer to a middle (third) magnetic forward-slash stripe of the B-burst. To encode a binary digit 1, a pattern 162 as shown is derived from pattern 150 whereby (1) the second magnetic backward-slash stripe of the X-burst is shifted closer to a first magnetic backward-slash stripe of the X-burst and the fourth magnetic backward-slash stripe of the X-burst is shifted closer to a fifth magnetic backward-slash stripe of the X-burst, (2) the second magnetic forward-slash stripe of the A-burst is shifted closer to a first magnetic forward-slash stripe of the A-burst and the fourth magnetic forward-slash stripe of the A-burst is shifted closer to a fifth magnetic forward-slash stripe of the A-burst, and (3) the second magnetic backward-slash stripe of the B-burst is shifted closer to a first magnetic backward-slash stripe of the B-burst and the fourth magnetic backward-slash stripe of the B-burst is shifted closer to a fifth magnetic backward-slash stripe of the B-burst.

For purposes of the present invention, encoded "0" pattern 161 and encoded "1" pattern 162 can be used record storage media identification key 41 within a LPOS word of a servo band 112 of a tape media 110 (FIG. 7).

Figure 11:
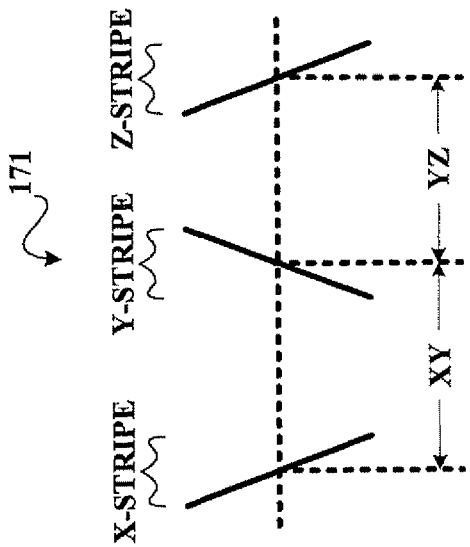
FIGS. 10 and 11 illustrate an exemplary encoding of differential timing based servo patterns as a third embodiment of a storage media identification key in accordance with the present invention.
Figure 10:
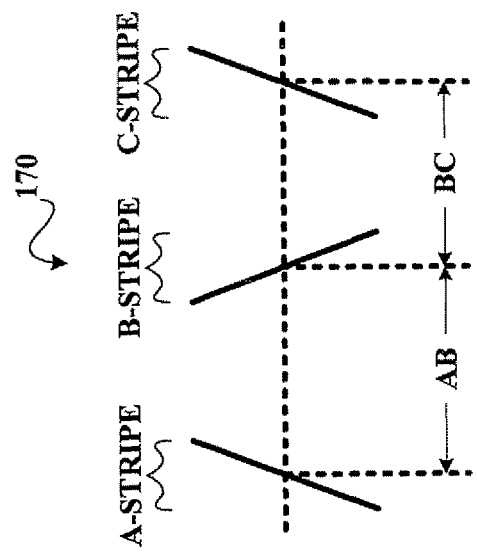

FIG. 10 illustrates a differential timing based servo pattern 170 of the present invention sequentially includes an A-magnetic forward-slash stripe (/), a B-magnetic backward-slash stripe (\) and a C-magnetic forward-slash stripe (/), and FIG. 11 illustrates a differential timing based servo pattern 171 of the present invention sequentially including an X-magnetic back-slash stripe (\), a Y-magnetic forward-slash stripe (/) and a Z-magnetic backward-slash stripe (\). Pattern 170 can represent a binary digit 0 and pattern 171 can represent a binary digit 1. Thus, for purposes of the present invention, "0" pattern 170 and "1" pattern 171 can be used record storage media identification key 41 within a LPOS word of a servo band 112 of a tape media 110 (FIG. 7).

Alternatively, pattern 170 can be employed within modulated differential timing based servo pattern strings as exemplary shown in FIGS. 12-15 to record storage media identification key 41 within a LPOS word of a servo band 112 of a tape media 110 (FIG. 7).

Figure 12:
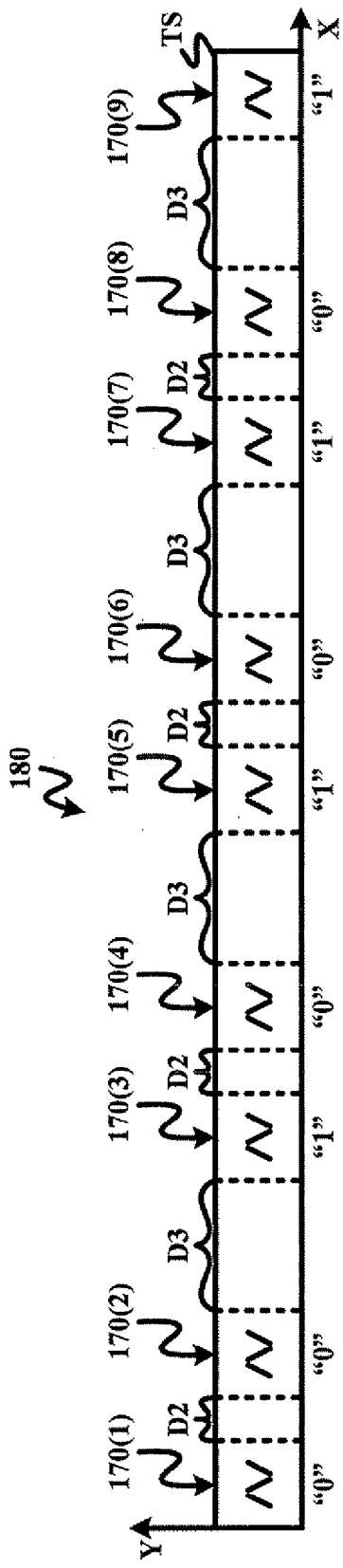
FIG. 12 illustrates a first exemplary pattern interspace modulation of a timing based servo band as a fourth embodiment of a storage media identification key in accordance with the present invention.

Specifically, FIG. 12 illustrates an exemplary pattern interspacing modulation of a differential timing based servo band 180 having a differential timing based pattern string of nine (9) differential timing based servo patterns 170 (FIG. 10) recorded on a track segment TS. Generally, an interspacing between patterns 170 is continually modulated to thereby obtain a binary encoding of band 180. Specifically, an interspace distance D2 between two consecutive patterns 170 equals one-half of standard interspace distance D1 (FIG. 13) to thereby encode the succeeding pattern 170 as a bit "0", and an interspace distance D3 between two consecutive patterns 170 equals twice the standard interspace distance D1 to thereby encode the succeeding pattern 170 as a bit "1". Thus, assuming the first pattern 170 is encoded as a "0", then band 180 has a "001010101" binary encoding based on the modulated interspacing between patterns 170 whereby band 180 can serve as a portion of or as storage media identification key 41 (FIG. 7).

Figure 13:
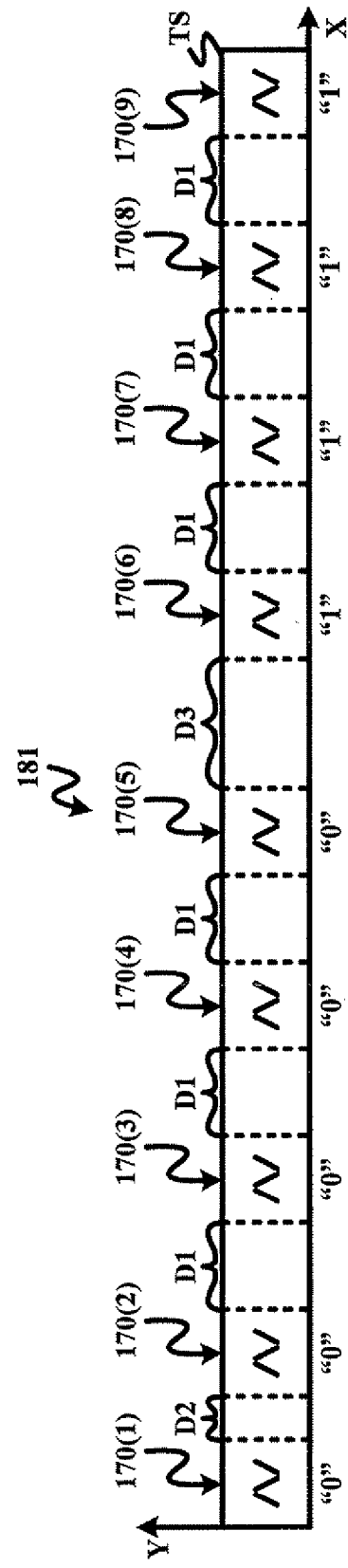
FIG. 13 illustrates a second exemplary pattern interspace modulation of a timing based servo band as a fifth embodiment of a storage media identification key in accordance with the present invention.

FIG. 13 illustrates an exemplary pattern interspacing modulation of a differential timing based servo band 181 having a differential timing based pattern string of nine (9) differential timing based servo patterns 170 (FIG. 10) recorded on a track segment TS. Generally, an interspacing between patterns 170 is intermittently modulated to thereby obtain a binary encoding of band 181. Specifically, interspace distance D2 between two consecutive patterns 170 equals one-half of a standard interspace distance D1 to thereby encode the succeeding pattern 170 as a bit "0", interspace distance D3 between two consecutive patterns 170 equals twice standard interspace distance D1 to thereby encode the succeeding pattern 170 as a bit "1", and interspace distance D1 represents a continuation of the encoding from the previous pattern 170 to the succeeding pattern 170. Thus, assuming the first pattern 170 is encoded as a "0", then band 181 has a "000001111" encoding based on the modulated interspacing between patterns 170 whereby band 181 can serve as a portion of or as storage media identification key 41 (FIG. 7).

Figure 14:
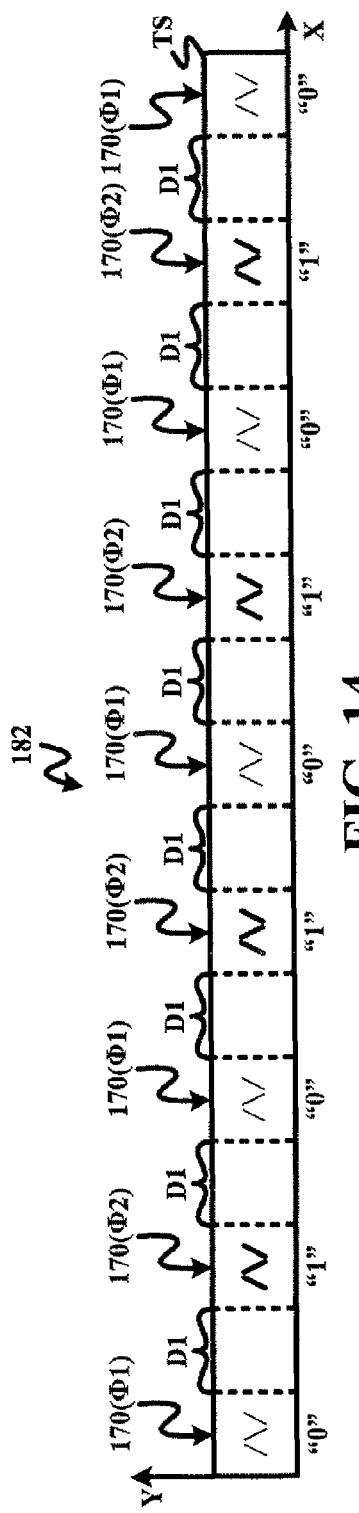
FIG. 14 illustrates an exemplary magnetic intensity modulation of a timing based servo band as a sixth embodiment of a storage media identification key in accordance with the present invention.

FIG. 14 illustrates an exemplary magnetic intensity modulation of a differential timing based servo band 182 having a differential timing based pattern string of nine (9) differential timing based servo patterns 170 (FIG. 10) recorded on a track segment TS. Generally, each pattern 170 is formed with one of two or more magnetic intensities to thereby provide a binary encoding of the pattern. Specifically, a magnetic intensity of $\Phi 1$ encodes each corresponding pattern 170 as a bit "0" and a magnetic intensity of $\Phi 2$ encodes each corresponding pattern 170 as a bit "1", with magnetic intensity $\Phi 1$ being less than magnetic intensity $\Phi 2$ as represented by the thickness of the corresponding stripes. Thus, band 182 has a "010101010" binary encoding based on the modulated magnetic intensities of patterns 170 whereby band 182 can serve as a portion of or as storage media identification key 41 (FIG. 7).

Figure 15:
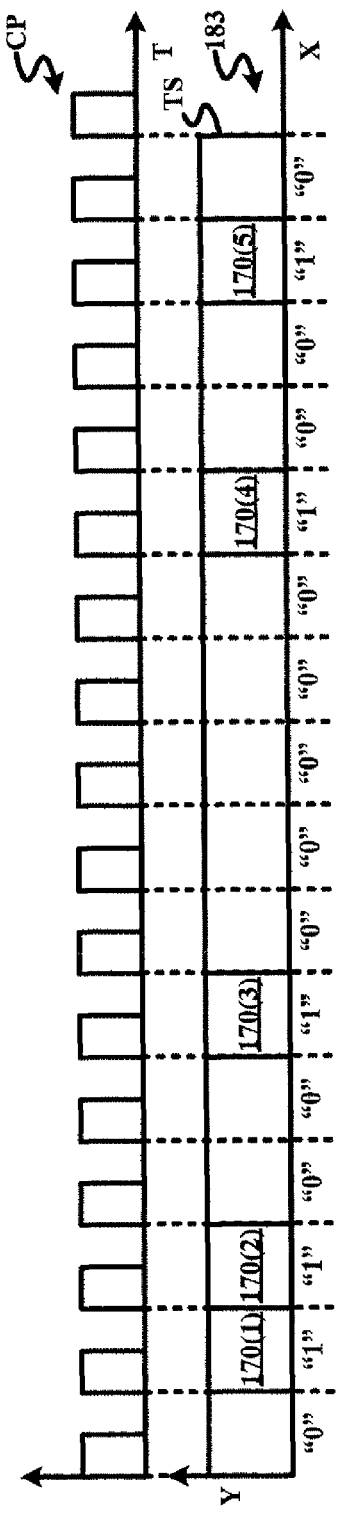
FIG. 15 illustrates an exemplary pulse position modulation of a timing based servo band as a seventh embodiment of a storage media identification key in accordance with the present invention.

FIG. 15 illustrates an exemplary pulse position modulation of a differential timing based servo band 183 having a differential timing based pattern string of five (5) differential timing based servo patterns 170 (FIG. 10) recorded on a track segment TS. Generally, patterns 170 are sparely positioned relative to a set of clock pulses CP to binary encode band 183. Specifically, a pulse position exclusive of a pattern 170 is encoded as a bit "0" and a pulse position inclusive of a pattern 170 is encoded as a bit "1". Thus, band 183 has a "0110010000010010" binary encoding based on the modulated pulse positioning of the patterns 170 whereby band 183 can serve as a portion of or as storage media identification key 41 (FIG. 7).

Those having ordinary skill in the art will appreciate the unlimited variations in modulated timing based servo bands, basic or differential, applicable for recording a storage media identification key of the present invention on a magnetic storage media as evidenced by FIGS. 8-15.

Those having ordinary skill in the art of storage media security techniques may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:
1. A secure data system, comprising:
   a storage media, wherein a storage media identification key is embedded in a non-user modifiable area of the storage media and associated with data recorded on the storage media; and
   a storage drive including a memory having a storage drive identification key embedded therein, wherein the storage drive is operable to allow access to the data recorded on the storage media based on a validation by the storage drive of the storage drive identification key as a function of the storage media identification key; and wherein a formation of the storage media identification key is based on a timing based servo pattern written in a manufacturer data segment of linear position (LPOS) word of a servo band.

2. The secure data system of claim 1,
wherein the storage media is a tape media; and
wherein the storage drive is a tape drive.

3. The secure data system of claim 1, wherein the non-user modifiable area of the storage media is the servo band of the storage media.

4. The secure data system of claim 1, wherein the non-user modifiable area of the storage media is format identification data region of a data track of the storage media.

5. The secure data system of claim 4, wherein a formation of the storage media identification key is based on a reserved field of the format identification data region.

6. The secure data system of claim 1,
wherein the storage media includes a key protection indicator indicative of a read protection of the data recorded on the storage media; and
wherein the storage drive is further operable to test a validity of the storage drive identification key as a function of the storage media identification key based on a detection of the key protection indicator as recorded on the storage media.

7. The secure data system of claim 6, wherein the key protection indicator is written in at least one data set of the storage media.

8. The secure data system of claim 1, wherein the storage media is further operable to validate the storage drive identification key as a function of the storage media identification key based on an equivalency between the storage media identification key and the storage drive identification key.

9. The secure data system of claim 1, wherein the storage drive identification key is resettable.

10. A secure data method for a storage media and a storage drive, the secure data method comprising:
embedding a storage media identification key in a non-user modifiable area of the storage media and associating the storage media identification key with data recorded on the storage media;
embedding a storage drive identification key in a memory of the storage drive; and
configuring the storage drive to allow access to the data recorded on the storage media based on a validation by the storage drive of the storage drive identification key as a function of the storage media identification key; and
wherein
a formation of the storage media identification key is based on a timing based servo pattern written in a manufacturer data segment of linear position (LPOS) word of a servo band.

11. The secure data method of claim 10,
wherein the storage media is a tape media; and
wherein the storage drive is a tape drive.

12. The secure data method of claim 10, wherein the non-user modifiable area of the storage media is the servo band of the storage media.

13. The secure data method of claim 10, wherein the non-user modifiable area of the storage media is format identification data region of a data track of the storage media.

14. The secure data method of claim 13, wherein a formation of the storage media identification key is based on a reserved field of the format identification data region.

15. The secure data method of claim 10, further comprising:
embedding a key protection indicator on the storage media, the key protection indicator indicative of a read protection by the storage media identification key of the data recorded on the storage media; and
configuring the storage drive to test a validity of the storage drive identification key as a function of the storage media identification key based on a detection by the storage media of the key protection indicator as recorded on the storage media.

16. The secure data method of claim 15, wherein the key protection indicator is written in at least one data set of the storage media.

17. The secure data method of claim 10, further comprising:
configuring the storage media to validate the storage drive identification key as a function of the storage media identification key based on an equivalency between the storage media identification key and the storage drive identification key.

18. The secure data method of claim 10, wherein the storage drive identification key is resettable.

* * * * *